United States Patent [19]
Liou

[11] Patent Number: 5,894,617
[45] Date of Patent: Apr. 20, 1999

[54] MULTIPURPOSE TOOL

[76] Inventor: Mou-Tang Liou, No. 33, Hsi Hu Road, Da Lie City, Taichung Hsien, Taiwan

[21] Appl. No.: 08/885,893

[22] Filed: Jun. 30, 1997

[51] Int. Cl.$^6$ ...................................................... B25F 1/00
[52] U.S. Cl. ........................... 7/107; 7/158; 81/9.44
[58] Field of Search ............................. 7/107, 127–129, 7/132, 158; 81/9.4, 9.44; 30/90.1, 90.4, 90.6, 90.8

[56] References Cited

U.S. PATENT DOCUMENTS

| | | | |
|---|---|---|---|
| 4,225,990 | 10/1980 | Theiler, Sr. | 7/107 |
| 5,280,659 | 1/1994 | Park | 7/107 X |
| 5,497,522 | 3/1996 | Chen | 7/107 X |
| 5,724,688 | 3/1998 | Chen | 7/107 X |

*Primary Examiner*—D. S. Meislin
*Attorney, Agent, or Firm*—Charles E. Baxley, Esq.

[57] ABSTRACT

A multipurpose tool includes a first member and a second member crosswise pivotally connected together, and a third member pivotally connected to the second member. Each of the first member and the second member has a plurality of recesses defined in one of two sides thereof and the recesses of the two members face with each other. The other side of the second member has a plurality of first stripping recesses defined therein. The third member has a plurality of second stripping recesses defined in a side facing to the first stripping recesses of the second member. Each of the first member and the third member has a stud extending laterally therefrom, and a locking member is pivotally disposed to the second member so that the locking member is selectably engaged with the two studs to combine the second member with the first member or the third member.

4 Claims, 8 Drawing Sheets

MULTIPURPOSE TOOL

BACKGROUND OF THE INVENTION

1. Field of the Invention

The present invention relates to a tool and, more particularly, to a multipurpose tool for dealing with cables.

2. Brief Description of the Prior Art

An electrician needs many tools, such as wire strippers, pliers, or wire cutters, to complete his/her work especially when dealing with different types of cables. The tools occupy a large space and weight a lot so that it is inconvenient for the electrician to carry the tools with him/her if he/she has to climb up to a working place.

The present invention intends to provide a multipurpose tool to mitigate and/or obviate the above-mentioned problems.

SUMMARY OF THE INVENTION

The present invention provides a multipurpose tool which comprises a first member, a second member crosswise and pivotally connected to the first member and a third member pivotally connected to the second member. The first member has a first end and a second which has a first grip formed thereto and the a first hole is defined through the first member. A first stud extends laterally from the first member and is located near the second end. The first member has a first side and a second side wherein the first side has a plurality of first recesses defined therein.

The second member has a first end and a second which has a second hole defined therethrough for a locking member pivotally engaged therewith, a third hole defined through the second member and located near the first end of the second member so as to crosswise and pivotally connect to the first member by extending a first bolt through the first hole and the third hole. The second member has a first side and a second side which faces to the first side of the first member and has a plurality of second recesses defined therein. A lateral plate extends from the first side of the second member and has a fourth hole defined therethrough. A plurality of first stripping recesses are defined in the first side of the second member and located near the second end of the second member. The locking member has a first notch and a second notch respectively defined in two opposite sides thereof.

The third member has a first end and a second end which has a second grip formed thereto. The first end of the third member has a sixth hole defined therethrough so that the third member is pivotally connected to the second member by extending a second bolt through the fourth hole of the second member and the sixth hole. The third member has a plurality of second stripping recesses defined in one of two sides thereof wherein the second stripping recesses face to the first stripping recesses. A second stud extends laterally from the third member so that the second stud is received in the first notch when the locking member is pivoted in one direction and the first stud is received in the second notch when the locking member is pivoted in another direction.

It is an object of the present invention to provide a multipurpose tool including a first member, a second member which is crosswise and pivotally connected to the first member and a third member which is crosswise and pivotally connected to the second member.

It is another object of the present invention to provide the multipurpose tool having a locking member disposed to the second member wherein the locking member selectably connect the second member to the first member or the third member.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
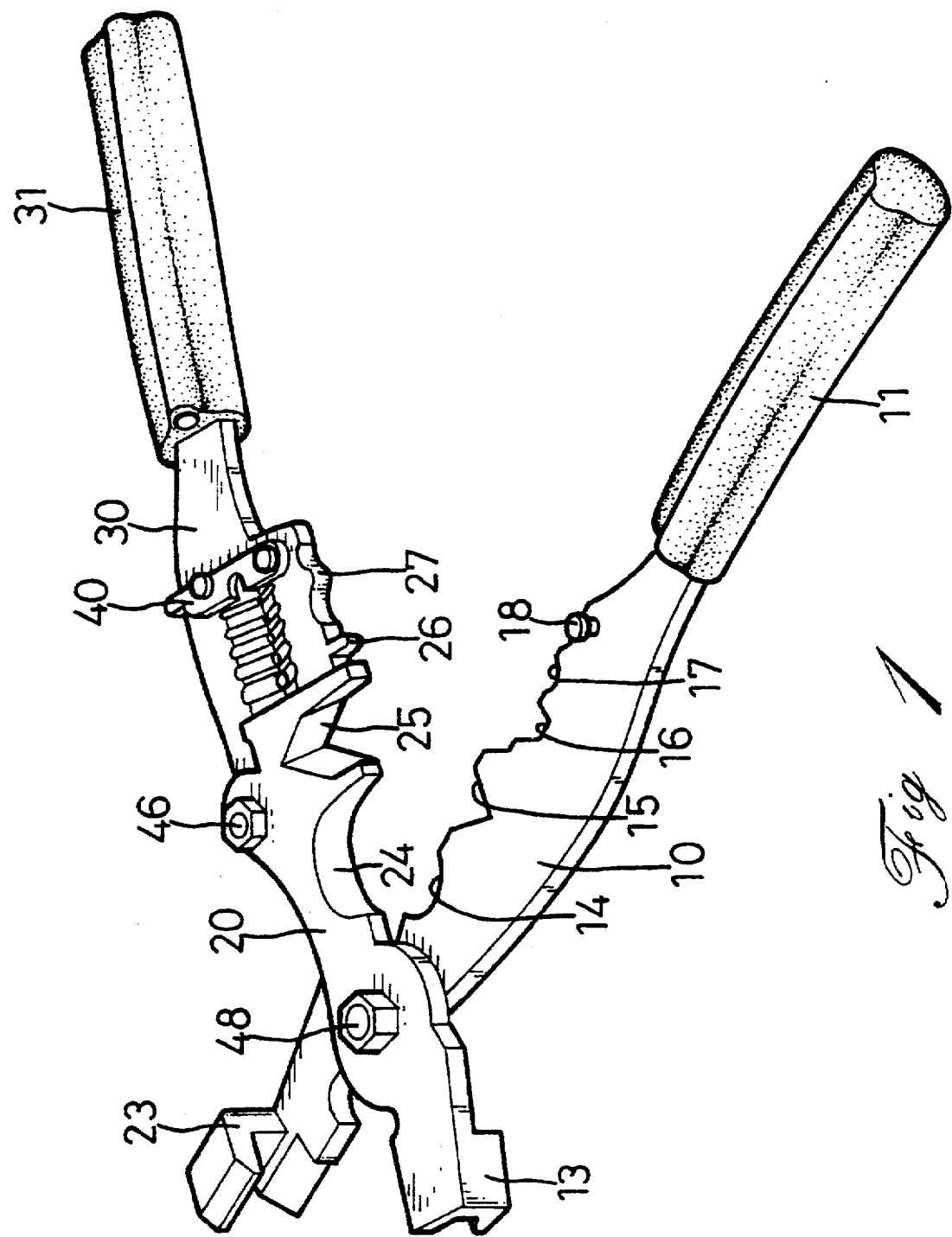
FIG. 1 is a perspective view of a multipurpose tool in accordance with the present invention.
Figure 2:
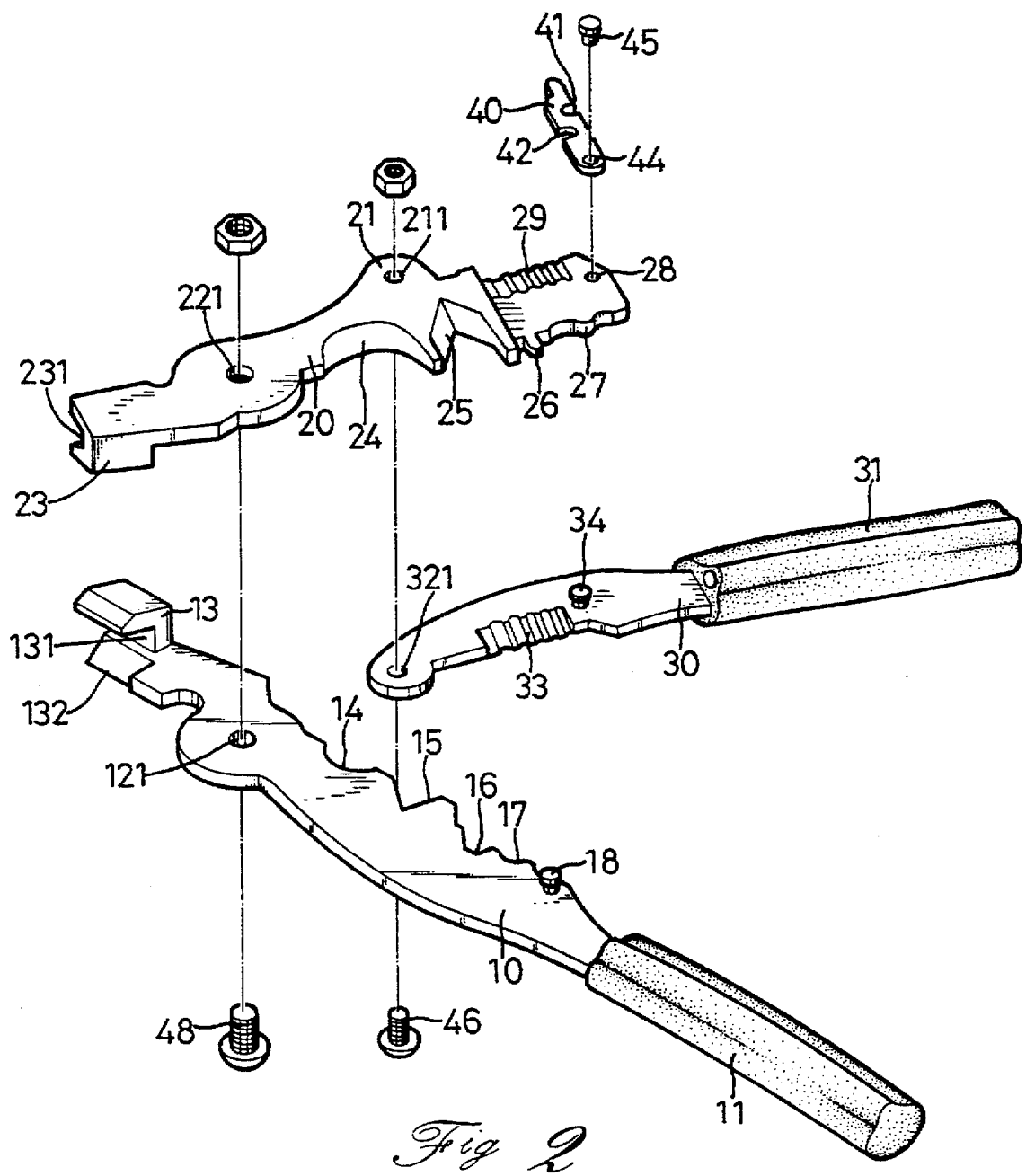
FIG. 2 is an exploded view of the multipurpose tool in accordance with the present invention.
Figure 3:
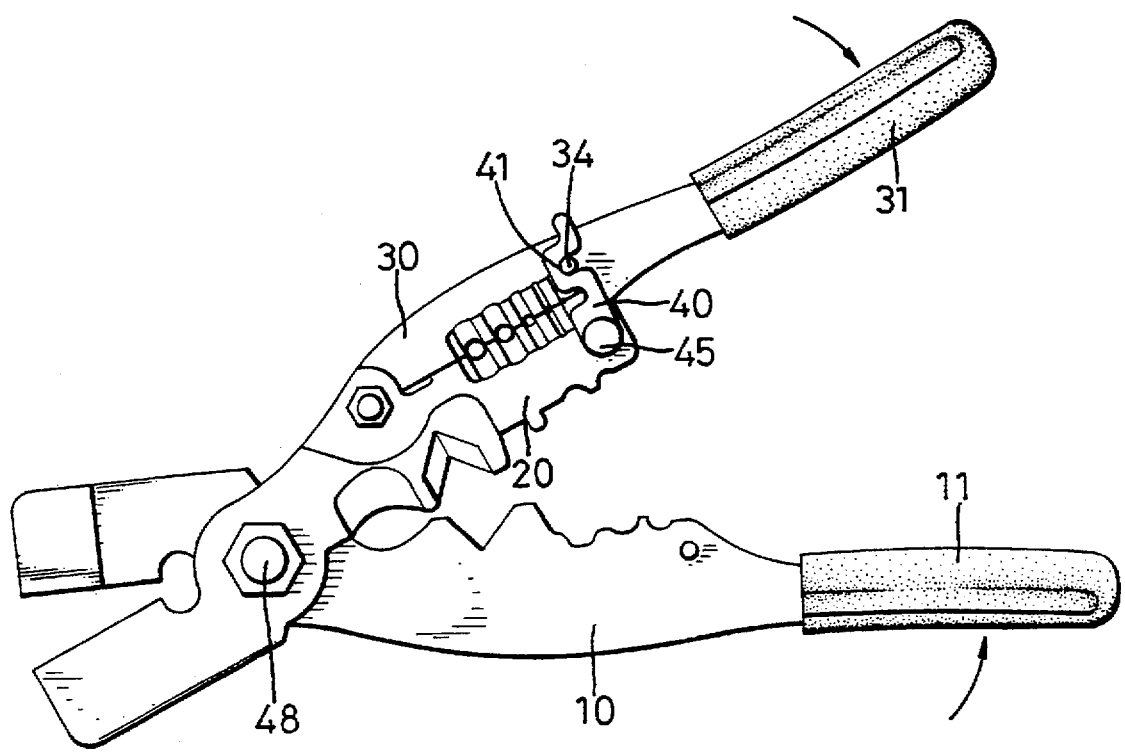
FIG. 3 is a top plan view of the multipurpose tool in accordance with the present invention.

Referring to the drawings and initially to FIGS. 1 through 3, a multipurpose tool in accordance with the present invention generally includes a first member 10, a second member 20 crosswise and pivotally connected to the first member 10, a third member 30 crosswise and pivotally connected to the second member 20, and a locking member 40 pivotally connected to the second member 20. The first member 10 has a first end and a second end which has a first grip 11 formed thereto, the first end having a first lateral member 13 extending laterally therefrom so as to define a first U-shaped groove 131 between the first end of the first member 10 and the first lateral member 13. A first hole 121 is defined through the first member 10 and located near the first end of the first member 10. A first stud 18 extends laterally from the first member 10 and located near the second end of the first member 10. The first member 10 has a first side and a second side wherein the first side has a plurality of first recesses 14, 15, 16 and 17 respectively defined therein. The first recess 14 is a shallow curved recess and the first recess 15 is a V-shaped recess, the first recess 16 being a U-shaped recess and the first recess 17 being a deeper curved recess. The first end of the first member 10 has a sharp edge 132 defined along the second side of the first member 10.

The second member 20 has a first end and a second which has a second hole 28 defined therethrough, the first end of the second member having a second lateral member 23 extending laterally therefrom so as to define a second U-shaped groove 231 between the first end of the second member 20 and the second lateral member 23. A third hole 221 is defined through the second member 20 and located near the first end of the second member 20 so that the first member 10 and the second member 20 are crosswise and pivotally connected together by extending a first bolt 48 through the first hole 121 and the third hole 221. The second member 20 has a first side and a second side which faces to the first side of the first member 10 and has a plurality of second recesses 24, 25 and 27 respectively defined therein. The second recess 24 is a shallow recess corresponding to the first recess 14 and the second recess 25 is a V-shaped recess corresponding to the first recess 15, the second recess 17 being a deeper curved recess corresponding to the first recess 17. A first protrusion 26 extends from the second side of the second member 20 and is located corresponding to the first recess 16 of the first member 10. A second protrusion 27 extends from the second side of the second member 20 and is located corresponding to the first recess 17 of the first member 10. A lateral plate 21 extends from the first side of the second member 20 and has a fourth hole 211 defined therethrough. A plurality of first stripping recesses 29 are defined in the first side of the second member 20 and located near the second end of the second member 20.

The locking member 40 has a first end with a fifth hole 44 defined therethrough and a second end so that the locking member 40 is pivotally disposed to the second end of the second member 20 by extending a pin 45 through the fifth hole 44 and the second hole 28 of the second member 20. The locking member 40 has a first notch 41 and a second notch 42 respectively defined in two opposite sides thereof and located near the second end of the locking member 40.

The third member 30 has a first end and a second end which has a second grip 31 formed thereto. The first end of the third member 30 has a sixth hole 321 defined therethrough so that the third member 30 is pivotally connected to the second member 20 by extending a second bolt 46 through the fourth hole 211 of the second member 20 and the sixth hole 321. The third member 30 has a plurality of second stripping recesses 33 defined in one of two sides thereof wherein the second stripping recesses 33 face to the first stripping recesses 29. A second stud 34 extends laterally from the third member 30 so that the second stud 34 is received in the first notch 41 when the locking member 40 is pivoted in one direction to combine the second member 20 and the third member 30 as shown in FIG. 1 and the first stud 18 is received in the second notch 42 when the locking member 40 is pivoted in another direction to combine the first member 10 and the second member 20 together as shown in FIG. 6.

Figure 4:
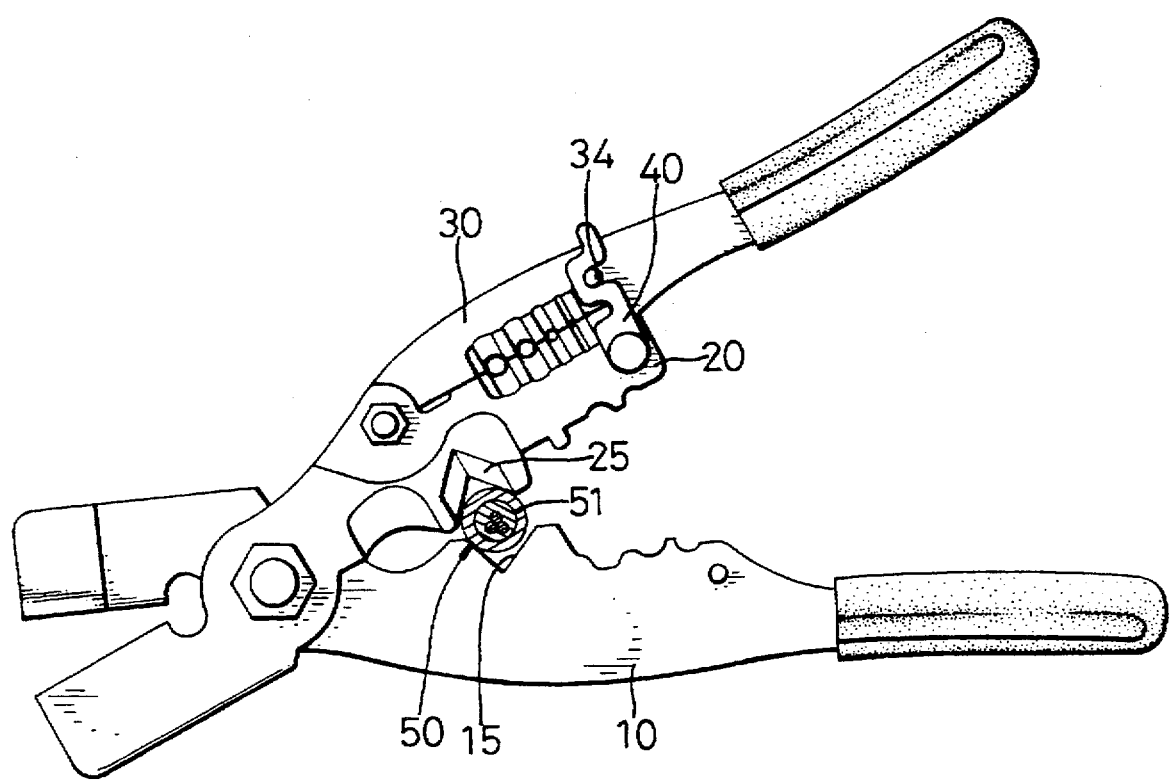
FIG. 4 is a top plan view to show the multipurpose tool in accordance with the present invention is used to peel a sheath of a cable.

Referring to FIG. 4, when the second member 20 and the third member 30 are combined together by the locking member 40, the multipurpose tool in accordance with the present invention is used to peel a sheath 51 of a cable 50 by receiving the cable 50 between the two first recess 15 and the second recess 25 so that when the first member 10 and the second member 20 is pushed toward with each other, the sheath 51 cab be cut and peeled.

Figure 5:
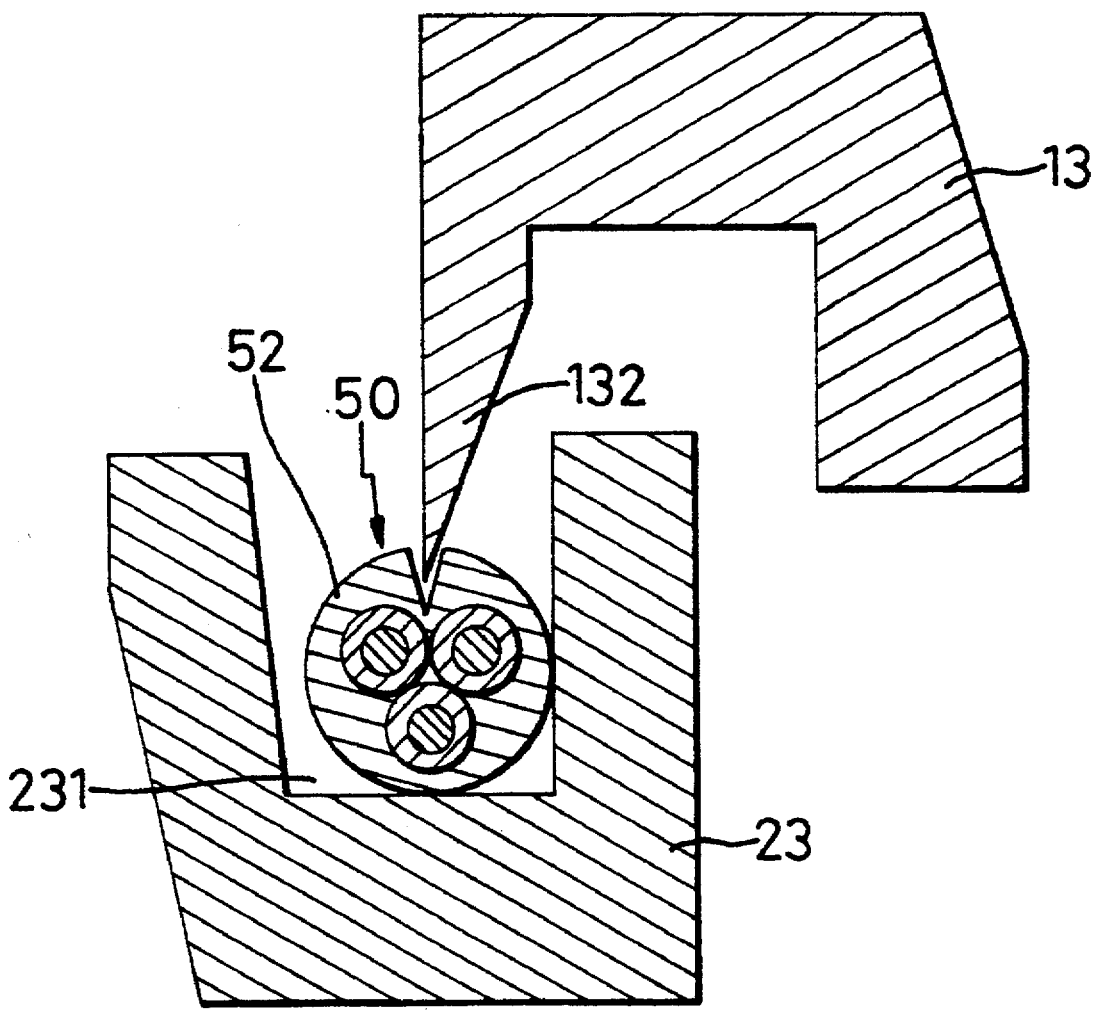
FIG. 5 is a cross-sectional view to show the multipurpose tool in accordance with the present invention is used to penetrate an isolation layer of the cable.

Referring to FIG. 5, the multipurpose tool in accordance with the present invention is used to cut an isolation layer 52 of the cable 50, the cable 50 is received in the second U-shaped groove 231 and the sharp edge 132 of the first member 10 penetrates into the isolation layer 52.

Figure 6:
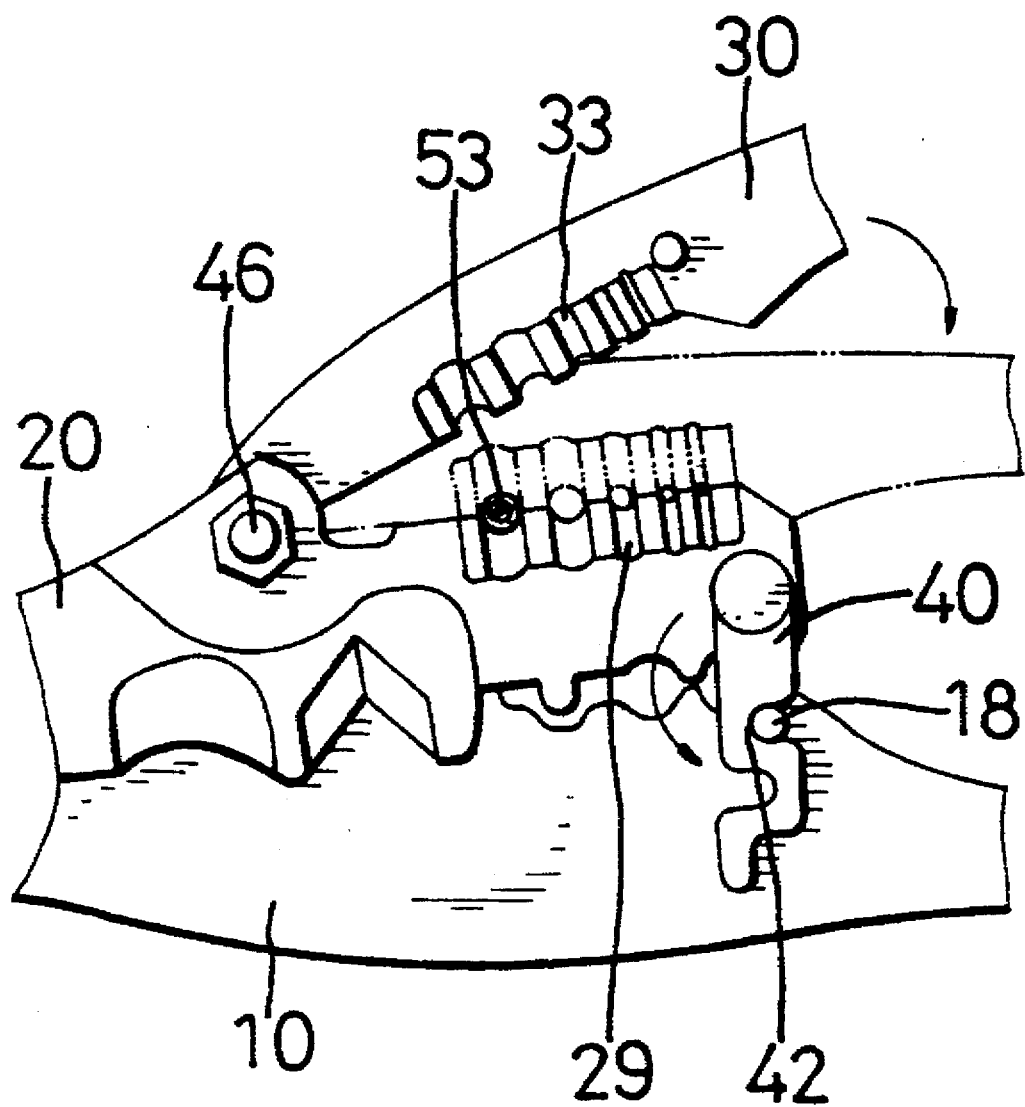
FIG. 6 is a top plan view to show the multipurpose tool in accordance with the present invention is used as a wire stripper.

Please refer to FIG. 6, the multipurpose tool in accordance with the present invention is used as a wire stripper wherein the locking member 40 is pivoted to receive the first stud 18 in the second notch 42 so that the third member 30 is able to pivoted about an axis of the second bolt 46. A wire 53 is received between the first stripping recess 29 and second stripping recess 33 so that when pulling the wire 53, an outer layer of the wire 53 can be stripped.

Figure 7:
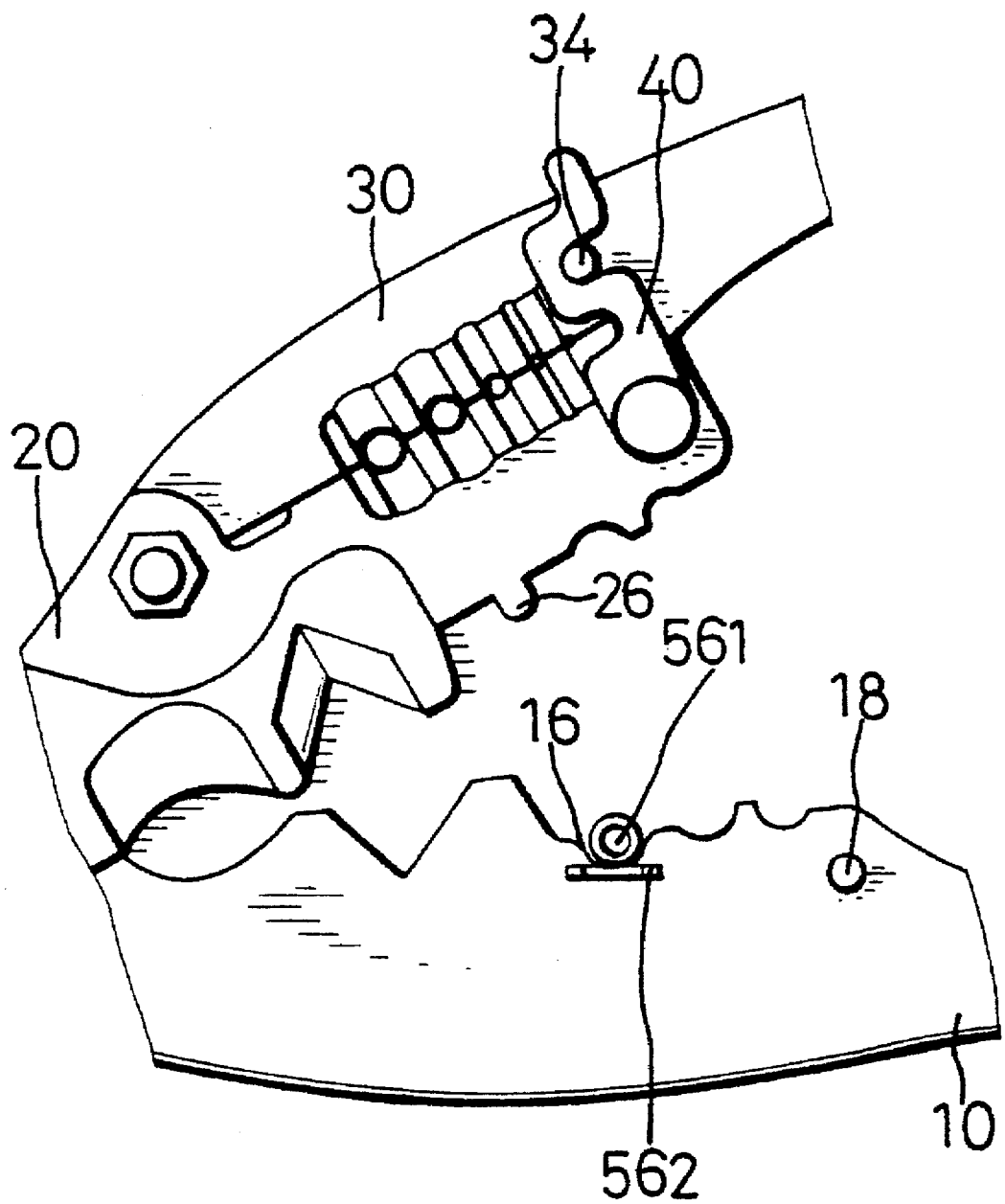
FIG. 7 is a top plan view to show the multipurpose tool in accordance with the present invention is used to press an end sleeve of a connector.

Referring to FIG. 7, when the second member 20 and the third member 30 are combined together, the multipurpose tool in accordance with the present invention is used to press an end sleeve 561 of a connector 56. The sleeve 561 is received in the first recess 16 and then the first protrusion 26 of the second member 20 is moved to press the sleeve 561.

Figure 8:
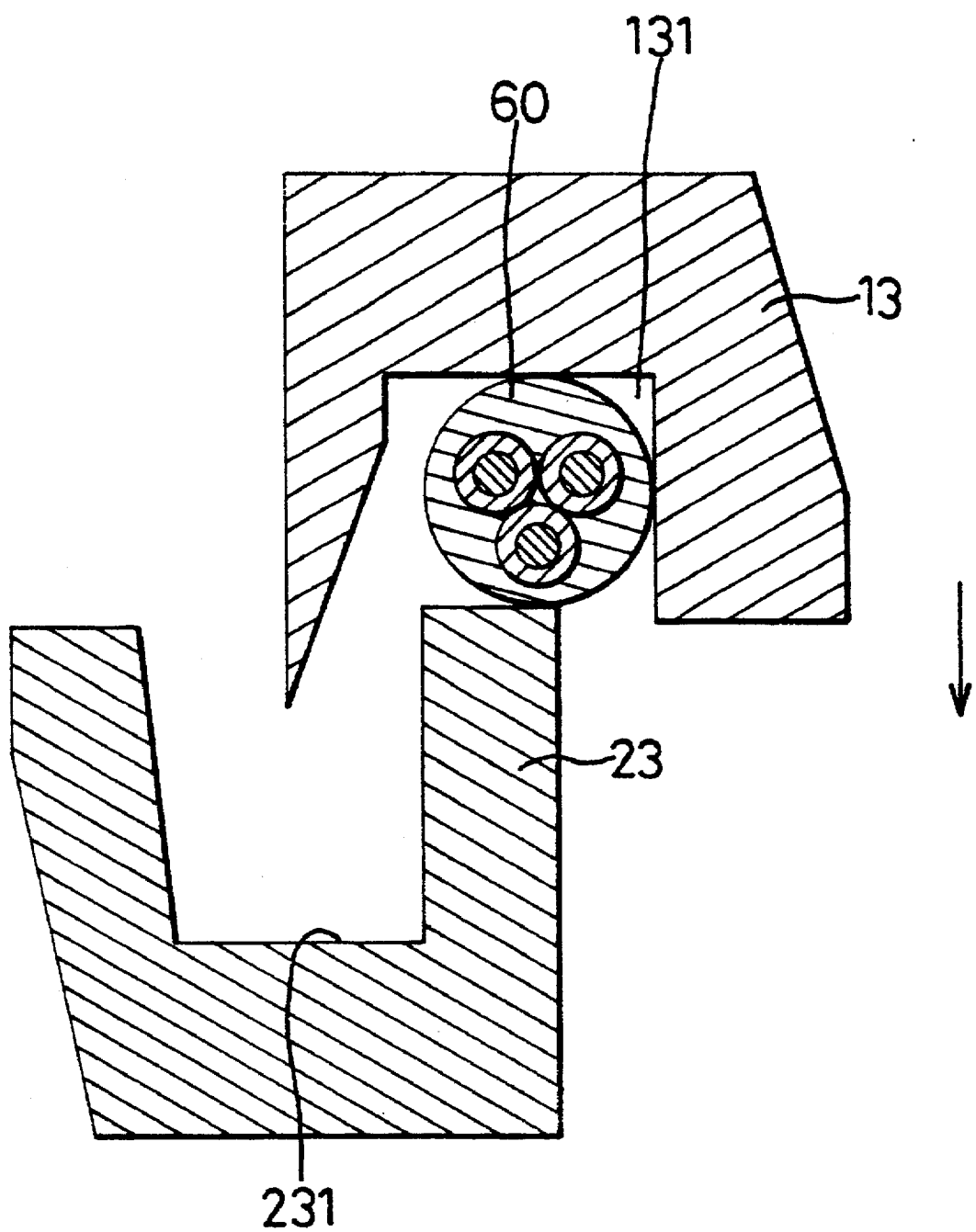
FIG. 8 is a cross-sectional view to show a cable is clamped and pulled by the multipurpose tool in accordance with the present invention.

Referring to FIG. 8, the multipurpose tool in accordance with the present invention is used to clamp and pull a cable 60 extending from a pipe (not shown) wherein the cable 60 is received in the first U-shaped groove 131 and is pressed by a distal end of the second lateral member 23 so that the cable 60 can be positioned and pulled by moving the multipurpose tool.

Accordingly, the multipurpose tool includes the first member 10, the second member 20 and the third member 30, and the second member 20 can be selectably combined with the first member 10 or the third member 30 so as to proceed more functions.

Although the invention has been explained in relation to its preferred embodiment, it is to be understood that many other possible modifications and variations can be made without departing from the spirit and scope of the invention as hereinafter claimed.

What is claimed is:

1. A multipurpose tool comprising:

a first member having a first end and a second end which has a first grip formed thereto, a first hole defined through said first member and located near said first end of said first member, a first stud extending laterally from said first member and located near said second end, said first member having a first side and a second side wherein said first side has a plurality of first recesses defined therein;

a second member having a first end and a second which has a second hole defined therethrough, a third hole defined through said second member and located near said first end of said second member so that said first member and said second member are crosswise and pivotally connected together by extending a first bolt through said first hole and said third hole, said second member having a first side and a second side which faces to said first side of said first member and has a plurality of second recesses defined therein, a lateral plate extending from said first side of said second member and having a fourth hole defined therethrough, a plurality of first stripping recesses defined in said first side of said second member and located near said second end of said second member;

a locking member having a first end with a fifth hole defined therethrough and a second end so that said locking member is pivotally disposed to said second end of said second member by extending a pin through said fifth hole and said second hole of said second member, said locking member having a first notch and a second notch respectively defined in two opposite sides thereof, and a third member having a first end and a second end which has a second grip formed thereto, said first end of said third member having a sixth hole defined therethrough so that said third member is pivotally connected to said second member by extending a second bolt through said fourth hole of said second member and said sixth hole, said third member having a plurality of second stripping recesses defined in one of two sides thereof wherein said second stripping recesses face to said first stripping recesses, a second stud extending laterally from said third member so that said second stud is received in said first notch when said locking member is pivoted in one direction and said first stud is received in said second notch when said locking member is pivoted in another direction.

2. The multipurpose tool as claimed in claim 1 wherein said first end of said first member has a first lateral member extending laterally therefrom so as to define a first U-shaped groove between said first end of said first member and said first lateral member, said first end of said second member having a second lateral member extending laterally therefrom and facing to said first lateral member so as to define a second U-shaped groove between said first end of said second member and said second lateral member.

3. The multipurpose tool as claimed in claim 2 wherein said first end of said first member has a sharp edge defined along said second side of said first member.

4. The multipurpose tool as claimed in claim 1 wherein a first protrusion extends from said second side of said second member and is located corresponding to one of said first recesses.

\* \* \* \* \*